United States Patent
Izumida et al.

(10) Patent No.: US 7,717,411 B2
(45) Date of Patent: May 18, 2010

(54) HIGH-STRENGTH STAINLESS STEEL SPRING AND METHOD OF MANUFACTURING THE SAME

(75) Inventors: Hiromu Izumida, Itami (JP); Nozomu Kawabe, Itami (JP); Shinei Takamura, Itami (JP); Teruyuki Murai, Itami (JP); Noritoshi Takamura, Kanagawa (JP)

(73) Assignees: Sumitomo Electric Industries, Ltd., Osaka (JP); Sumitomo (SEI) Steel Wire Corp., Hyogo (JP); NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 12/279,287

(22) PCT Filed: Feb. 16, 2007

(86) PCT No.: PCT/JP2007/052868

§ 371 (c)(1),
(2), (4) Date: Aug. 13, 2008

(87) PCT Pub. No.: WO2007/105410

PCT Pub. Date: Sep. 20, 2007

(65) Prior Publication Data

US 2009/0174129 A1    Jul. 9, 2009

(30) Foreign Application Priority Data

Feb. 23, 2006   (JP) .............................. 2006-047031

(51) Int. Cl.
*F16F 1/02* (2006.01)
(52) U.S. Cl. ...................................... 267/166
(58) Field of Classification Search ................ 148/333; 267/166–179
See application file for complete search history.

(56) References Cited

U.S. PATENT DOCUMENTS 6,627,005 B1 *  9/2003  Kawabe et al. .............. 148/226

(Continued)

FOREIGN PATENT DOCUMENTS

CN    1646714    7/2005

(Continued)

OTHER PUBLICATIONS

Patent Abstracts of Japan, Publication No. 11-012695, dated Jan. 19, 1999, 1 page.

(Continued)

*Primary Examiner*—Christopher P Schwartz
(74) *Attorney, Agent, or Firm*—Osha • Liang LLP

(57) ABSTRACT

Provided is a high-strength stainless steel spring exhibiting a good workability and having a high load characteristic. Thus, the high-strength stainless steel spring of the invention has an chemical component containing 0.04 to 0.08% by mass of C, 0.15 to 0.22% by mass of N, 0.3 to 2.0% by mass of Si, 0.5 to 3.0% by mass of Mn, 16 to 20% by mass of Cr, 8.0 to 10.5% by mass of Ni, 0.5 to 3.0% by mass of Mo, and the balance of Fe and inevitable impurities, and when the average diameter of the coil is represented by D and further the diameter of the steel wire is represented by d in the case that cross sections of the stainless steel wire are in a complete round form or the value obtained by subtracting the average coil diameter from the outer diameter of the coil is represented by d' in the case that the cross sections of the stainless steel wire are in a form other than the complete round form, the spring has a spring index D/d or D/d' of 2 to 6.

7 Claims, 3 Drawing Sheets

U.S. PATENT DOCUMENTS

| | | | |
|---|---|---|---|
| 2003/0024610 A1* | 2/2003 | Ibakaki et al. | 148/333 |
| 2003/0201036 A1* | 10/2003 | Hashimura et al. | 148/333 |
| 2005/0173028 A1* | 8/2005 | Suda et al. | 148/333 |
| 2006/0201588 A1* | 9/2006 | Suda et al. | 148/333 |
| 2007/0082223 A1 | 4/2007 | Izumida et al. | |

FOREIGN PATENT DOCUMENTS

| | | |
|---|---|---|
| JP | 63-34335 | 2/1988 |
| JP | 04-183819 | 6/1992 |
| JP | 5-069200 | 3/1993 |
| JP | 9-133168 | 5/1997 |
| JP | 11-012695 | 1/1999 |
| JP | 2000-73156 | 3/2000 |
| JP | 2000-213579 | 8/2000 |
| JP | 2000-239804 | 9/2000 |
| JP | 2001-220650 | 8/2001 |
| JP | 2003-73737 | 3/2003 |
| JP | 2003-226940 | 8/2003 |
| JP | 2005-133137 | 5/2005 |

OTHER PUBLICATIONS

Patent Abstracts of Japan, Publication No. 2003-226940, dated Aug. 15, 2003, 1 page.
Patent Abstracts of Japan, Publication No. 2005-133137, dated May 26, 2005, 1 page.
Patent Abstracts of Japan, Publication No. 04-183819, dated Jun. 30, 1992, 1 page.
Patent Abstracts of Japan, Publication No. 2000-239804, dated Sep. 5, 2000, 1 page.
Patent Abstracts of Japan, Publication No. 05-069200, dated Mar. 23, 1993, 1 page.
Patent Abstracts of Japan, Publication No. 2000-073156, dated Mar. 7, 2000, 1 page.
Patent Abstracts of Japan, Publication No. 2001-220650, dated Aug. 14, 2001, 1 page.
Patent Abstracts of Japan, Publication No. 2000-213579, dated Aug. 2, 2000, 1 page.
Patent Abstracts of Japan, Publication No. 2003-073737, dated Mar. 12, 2003, 1 page.
Patent Abstracts of Japan, Publication No. 09-133168, dated May 20, 1997, 1 page.
Patent Abstracts of Japan, Publication No. 63-034335, dated Feb. 15, 1988, 1 page.
International Search Report issued in PCT/JP2007/052868, mailed on May 15, 2007, with translation, 4 pages.
English Abstract from espacenet for application with Publication No. CN1646714, Publication Date: Jul. 27, 2005, 1 page.
Chinese Notification of the First Office Action for Chinese patent application No. 200780006373.8, dated Feb. 26, 2010, and English translation thereof, 12 pages.

* cited by examiner (a)

(b)

HIGH-STRENGTH STAINLESS STEEL SPRING AND METHOD OF MANUFACTURING THE SAME

TECHNICAL FIELD

The present invention relates to a stainless steel spring used in articles required to have high strength and high corrosion resistance, such as automobile parts, household electric appliance parts, or die springs; and a method of manufacturing the same.

BACKGROUND ART

As materials for a high-strength spring member to which a high load is applied, there have hitherto been a piano wire and a Si—Cr steel oil tempered wire for cold working, and a Si—Mn based steel wire for springs, etc. for hot working.

These high-strength materials each have a problem that the corrosion resistance is low. As a method for improving the corrosion resistance of a spring, painting, corrosion-resistant plating treatment or the like can be supposed. However, Si—Cr steels and Si—Mn steels cannot be subjected to plating treatment since it is feared that delayed fracture is generated therein. About a piano wire, chromate treatment, which is the most effective corrosion resistance treatment therefor, has been regulated on the basis of environmental problems in recent years. Thus, the treatment has been desired to be changed to an alternative treatment wherein no hexavalent chromium is used. Practically, only painting is a solution about the corrosion resistance. Drawbacks of these surface treatments are in that the treatments need to be conducted after a material is made into a spring form, and thus the treatments become batch treatments, whereby an increase in manufacturing costs cannot be avoided; and when the surface of a material is injured during the use of the material as a spring, corrosion advances from the injure as a starting point.

A solution against this problem is a method of adopting stainless steel as a spring material. According to this method, painting and surface treatment can be omitted; therefore, costs for manufacturing the whole of a spring can be controlled into a low value although material costs increase by the adoption of stainless steel. However, austenite stainless steel, which is particularly good in corrosion resistance, may not give a sufficient strength.

The problem that high-strength materials have is not limited only to corrosion resistance. The materials have a problem that the workability is low because of the high strength. When a spring that can resist a high load is designed, it is necessary to make the spring index thereof small in order to make the spring constant high. FIG. 3 are views for explaining a conventional spring index. When cross sections of a steel wire are in a complete round form, the average coil diameter D representing the distance from the central line of one of the cross sections of the steel wire to the central line of another and the diameter d of the steel wire are used to represent the spring index by D/d, as illustrated in FIG. 3(a). When cross sections of a steel wire are not in a complete round form, the value d' obtained by subtracting the average coil diameter D from the coil outer diameter D' is used to represent the coil index by D/d', as illustrated in FIG. 3(b). A material of a spring is required to have a high workability when the spring index thereof is made small. Accordingly, the toughness is insufficient, and it is feared that cracking or seizure is generated.

As a prior art about the workability, suggested is a method of quenching and tempering steel in a wire form once, subjecting the steel to coiling, and again quenching and tempering the steel (see JP-A-2000-213579 (Patent Document 1), and JP-A-2003-073737 (Patent Document 2)). This is a method of using the quenching and tempering in the steel wire form as a treatment wherein importance is attached to toughness; subjecting the wire to coiling; and using a treatment wherein importance is attached to strength when the second quenching and tempering are carried out. This method certainly makes it possible to manufacture a high-strength spring in a state of a product that can resist a high load. However, costs increase by the two thermal treatments although the toughness problem is solved. Furthermore, the above-mentioned corrosion resistance cannot be improved.

In order to attain an enhancement in spring strength, a spring having a rectangular section or a spring having an elliptical section may be used in recent years (see JP-A-09-133168 (Patent Document 3), and JP-A-63-034335 (Patent Document 4)). This is because a large energy can be obtained within a restricted space since this method makes it possible to decrease the adhesion height. However, about a steel wire having such a section, a part of the inside of the section is locally worked; thus, when the wire is subjected to wire drawing work and spring work, a risk that a shortage in the toughness is generated increases.

Patent Document 1 JP-A-2000-213579
Patent Document 2 JP-A-2003-073737
Patent Document 3 JP-A-09-133168
Patent Document 4 JP-A-63-034335

DISCLOSURE OF THE INVENTION

Problems to be Solved by the Invention

An object of the invention is to provide a high-strength stainless steel spring exhibiting good workability in wire drawing work and spring work and having a high load characteristic equivalent to that of Si—Cr steel oil tempered wires. Another object thereof is to provide a method of manufacturing a high-strength stainless steel spring which makes the total manufacturing costs thereof low since painting and surface treatment for corrosion resistance are never required.

Means for Solving the Problems

The high-strength stainless steel spring of the invention is made of a stainless steel wire, wherein the stainless steel wire has an chemical component containing 0.04 to 0.08% by mass of C, 0.15 to 0.22% by mass of N, 0.3 to 2.0% by mass of Si, 0.5 to 3.0% by mass of Mn, 16 to 20% by mass of Cr, 8.0 to 10.5% by mass of Ni, 0.5 to 3.0% by mass of Mo, and the balance of Fe and inevitable impurities, and when the average diameter of the coil is represented by D and further the diameter of the steel wire is represented by d in the case that cross sections of the stainless steel wire are in a complete round form or the value obtained by subtracting the average coil diameter from the outer diameter of the coil is represented by d' in the case that the cross sections of the stainless steel wire are in a form other than the complete round form, said spring has a spring index D/d or D/d' of 2 to 6.

The high-strength stainless steel spring manufacturing method of the invention is a method of manufacturing this spring and comprises the steps of: subjecting a stainless steel to wire drawing work, thereby forming a stainless steel wire; subjecting the stainless steel wire to coiling, thereby forming a spring form; and annealing the spring-form stainless steel wire at a temperature of 425 to 600° C.

EFFECTS OF THE INVENTION

According to the invention, the addition of N causes the texture of austenite stainless steel to be strengthened, the formation of a cluster of Mo—N causes an improvement in the strength, and further making conditions for works and thermal treatment appropriate makes it possible to provide a spring excellent in workability, strength and corrosion resistance. The spring is an austenite stainless steel spring excellent in corrosion resistance; therefore, plating and painting for corrosion resistance by batch treatment can be omitted, so that the total manufacturing costs can be decreased.

BEST MODES FOR CARRYING OUT THE INVENTION

In the high-strength stainless steel coil spring of the invention, the chemical component of the stainless steel is a composition containing 0.04 to 0.08% by mass of C, 0.15 to 0.22% by mass of N, 0.3 to 2.0% by mass of Si, 0.5 to 3.0% by mass of Mn, 16 to 20% by mass of Cr, 8.0 to 10.5% by mass of Ni, 0.5 to 3.0% by mass of Mo, and the balance of Fe and inevitable impurities, and the spring index D/d or D/d' is from 2 to 6. The following will describe reasons for selecting the constituting elements and restricting ranges of component amounts thereof.

C is melted, in the form of an interstitial solid solution, into crystal lattices, so as to produce an effect of introducing strains therein to strengthen it. Furthermore, C has an effect of forming a Cottrell atmosphere to fix and bond a dislocation in the metal texture to improve the strength. However, C tends to bond to Cr, Nb, Ti or the like in steel to form a carbide. For example, when Cr carbide is present in crystal grain boundaries, a Cr depletion layer is generated in the vicinity of the grain boundaries since the diffusion speed of Cr in the austenite is low. As a result, the toughness and corrosion resistance lower. Thus, the content by percentage is set to 0.04% or more by mass to improve the strength effectively, and the content by percentage is set to 0.08% or less by mass to make the effect onto a fall in the toughness and the corrosion resistance small.

Figure 1:
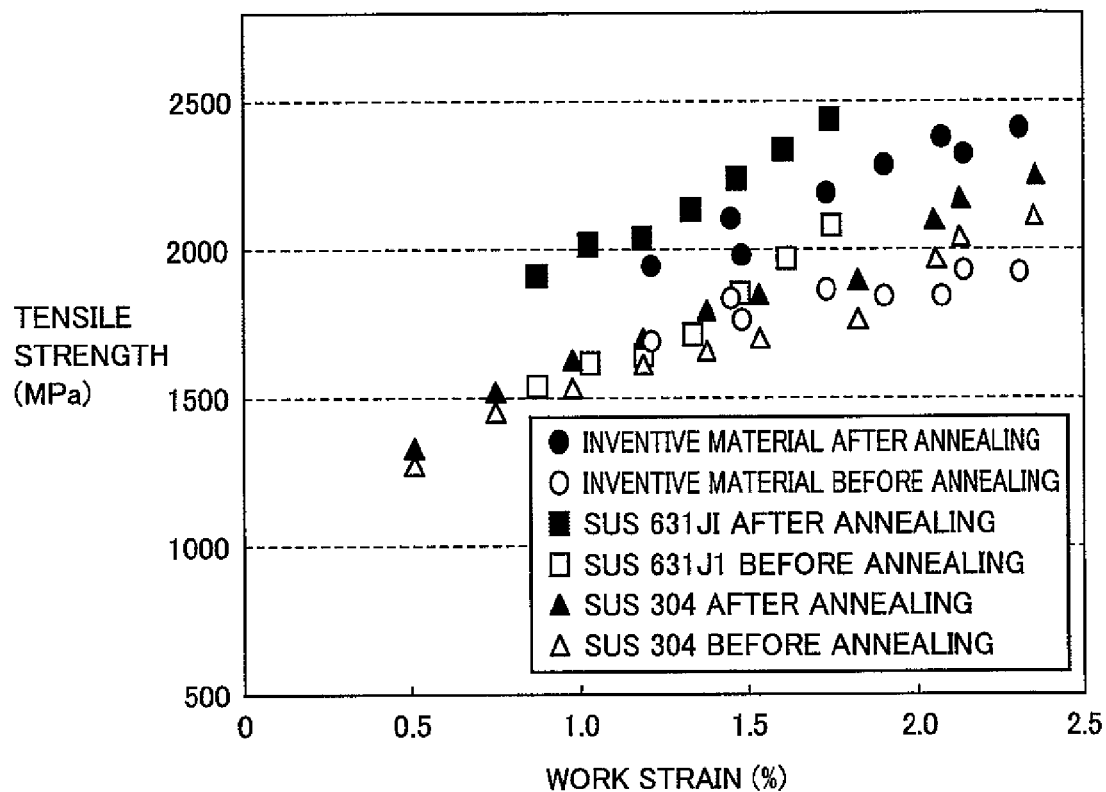
FIG. 1 is a graph showing a relationship between the work strain when materials are subjected to wire drawing work and tensile strengths before and after they are annealed in the invention.

N, as well as C, is an element for strengthening interstitial solid solution, and is also a Cottrell-atmosphere-forming element. N is combined with Cr or Mo in steel to form a cluster, thereby producing an effect of improving the strength. This strength-improving effect based on the Mo—N cluster is obtained by temper (low temperature annealing). The inventors have obtained a finding that the ratio of the strength improvement is varied in accordance with strains introduced by works before the temper. FIG. 1 shows a relationship between the work strain when materials are subjected to wire drawing work and tensile strengths before and after they are annealed in the invention. In FIG. 1, values of the tensile strength before the annealing are represented by open symbols, and values of the tensile strength after the annealing are represented by solid symbols. When a material is subjected to coiling and subsequently the material is annealed at low temperature, the effect of removing strains can be obtained. In the invention, a strength-improving effect can also be obtained as obtained by temper. For this reason, in the present specification, such annealing is referred to as temper also.

As illustrated in FIG. 1, an embodiment of the stainless steel of the invention, which may be referred to as the "inventive material" hereinafter, contains 0.20% by mass of N and have, as a base, SUS 304 (JIS code); therefore, the hardening ratio based on work is substantially equal to that of SUS 304. However, by the addition of N, which is an austenite stabilizing element, strain-induced martensite is not generated even when the work strain is 2.0 or more. As a result, the stainless steel of the invention has a somewhat lower strength than SUS 304. The roughness of the inventive material at this time shows a value equal to or higher than that of SUS 304.

The strengths of the inventive material after it is annealed are compared therebetween. In this case, it is understood that: a rise in the strength after temper is larger as the amount of the introduced work strain is larger; and the value is equivalent to that of SUS 631 (JIS code), which is a precipitation strengthened stainless steel of an intermetallic compound of Ni and Al. This is a result based on the generation of a Mo—N cluster. In other words, the inventive material is more easily worked than SUS 304, and the strength thereof after it is annealed is as high as SUS 631. Accordingly, SUS 304 has an excellent toughness but has a drawback that the strength is insufficient. SUS 631 has an excellent strength but has a drawback that the workability is low. The inventive material can compensate for both of the drawbacks.

The addition of N produces excellent effects on improvement of the workability (toughness) and the strength, as described above. However, the solid solution thereof into the phase of austenite is limited. By the addition thereof in a large amount of 0.20% or more by mass, blowholes are generated when the steel is cast. This phenomenon can be restrained to some degree by raising the solid solution limit by the addition of an element having a high affinity with N, such as Cr or Mn. However, when the element is excessively added, it becomes necessary to control the atmospheres, such as the temperature, when steel is melted. As a result, costs may increase. Thus, the value of the content by percentage of N is set to 0.15% or more by mass, preferably 0.18% or more in order to make effective the stability of the austenite phase based on the addition of N and the strength rise based on the formation of the Mo—N cluster. On the other hand, the value is set to 0.22% or less by mass, preferably 0.20% or less by mass in order not to make the degree of the difficulty of the melting and casting high.

Si undergoes solid solution, thereby producing an effect of lowering stacking fault energy and improving the mechanical characteristics. Si is also effective as a deoxidizer when steel is melted and refined, and is contained in an amount of about 0.6 to 0.7% by mass in ordinary austenite stainless steel. In order to obtain mechanical characteristics based on solid solution strengthening, it is preferred to add Si in an amount of 0.8% or more by mass. Thus, in order to obtain an effect as a deoxidizer, the content by percentage is set to 0.3% or more by mass, more preferably 0.5% or more by mass. Considering a deterioration in the toughness, the content by percentage is set to 2.0% or less by mass, preferably 1.2% or less by mass.

Mn is used as a deoxidizer when steel is melted and refined, and is effective for the phase stabilization of the γ phase (austenite) of austenite stainless steel. Thus, Mn may be an alternative element for Ni, which is expensive. As described above, Mn has an effect of raising the solid solution limit of N in austenite. However, Mn produces a bad effect onto the oxidation resistance at high temperature. Thus, the content by percentage of Mn is set into the range of 0.5 to 3.0% by mass. When importance is attached in particular to the corrosion resistance, the content by percentage is preferably from 0.5 to 2.0% by mass. In order to raise the solid solution limit and make the number of micro-blowholes of N very small, it is preferred to add Mn in an amount of 2.0 to 3.0% by mass. In this case, however, the corrosion resistance is somewhat lowered. Accordingly, the addition amount of Mn is desirably adjusted in accordance with the usage.

Cr is a main constituting element of austenite stainless steel, and has an action effective for gaining heat resistance characteristics and oxidization resistance. Thus, when the Ni equivalent and the Cr equivalent are calculated from the other element components of the inventive material and the phase stabilization of the γ phase (austenite) is considered, the content by percentage of Cr is set to 16% or more by mass, preferably 17% or more by mass in order to gain necessary heat resistance characteristics. Considering a deterioration in the toughness, the content by percentage is set to 20% or less by mass, preferably 19% or less by mass.

Ni is an effective for stabilizing the γ phase (austenite). However, if the content by percentage of N is set to 0.2% or more by mass in the invention, the incorporation of a large amount of Ni causes the generation of blowholes. In this case, the addition of Mn, which has a high affinity with N, is effective for restraining the blowholes. Accordingly, in order to obtain austenite stainless steel, it is necessary to add Ni considering the addition amount of Mn. Thus, the addition amount of Ni is added to 8.0% or more by mass in order to stabilize the γ phase (austenite). In order to restrain the blowholes and restrain an increase in costs, the amount is set to 10.5% or less by mass, preferably 10.0% or less by mass. When the amount of Ni is in the range of less than 10.0% by mass, Ni makes it possible to attain solid solution of N easily, in particular, in the step of melting and casting the steel. Accordingly, it is very advantageous from the viewpoint of costs to add N, thereby making the use amount of Ni, which is an expensive element, as small as possible.

Mo undergoes substitutional solid solution in the γ phase (austenite), thereby contributing largely to an improvement in the strength and sure maintenance of corrosion resistance. Furthermore, Mo is combined with N to form a cluster, whereby a high rise in the strength can be given. Thus, the lowest content by percentage of Mo necessary for improving the strength is set to 0.5% or more by mass, preferably 1.0% or more by mass. Considering a deterioration in the workability and a decrease in material costs, the content by percentage is set to 3.0% or less by mass, preferably 2.0% or less by mass.

When the above-mentioned chemical components are melted to produce a steel, the metallic texture of the steel substantially becomes a single phase of austenite. In the surface of the wire of the steel, a passivation membrane made mainly of a Cr oxide is formed. This coating is very thin and homogeneous, and has a dense structure; therefore, the coating has a very great function for keeping the corrosion resistance of the steel and a beautiful appearance (metallic luster) thereof. The steel exhibits a high corrosion resistance which cannot be compared with that of Si—Cr steel and Si—Mn steel, which are each the above-mentioned high-strength steel and are each tempered martensite steel, a piano wire (perlite steel), and so forth.

The following will describe reasons why the structure of the inventive material and the method for manufacturing the material are limited. The inventive material is characterized in that a wire of the above-mentioned stainless steel, the components of which are limited, is used and the spring index D/d or D/d' is 2 or more and 6 or less, preferably 3 or more and 5 or less. This originates from a matter that the strength-raising effect based on the Mo—N cluster depends on the amount of introduced work strain. The strength-raising effect depends on the area reduction (ratio) based on wire drawing work, and the wire diameter of a wire material before it is subjected to wire drawing work is industrially limited. In general, a wire having a wire diameter of 5.5 mm is used; thus, when the wire diameter is, for example, from about 2 to 3 mm, or when the steel wire has a rectangular cross section having a sectional area equivalent to that of a steel wire having a wire diameter of 2 to 3 mm, it is permissible that work strain can be introduced at largest up to only an amount of about 2. However, the inventors have found out that when this steel wire is subjected to coiling, the strength is improved by setting the spring index D/d or D/d' in the range of 2 or more and 6 or less, so that a high spring constant can be obtained. This would be because the wire is locally worked, so that work strain is more effectively introduced than in the case of wire drawing work, wherein uniform work is performed. This work is carried out under severe work conditions under which toughness shortage is generated in conventional high-strength materials; however, this work can be attained since the inventive material has the above-mentioned high workability. This work is also effective for raising the spring constant. This effect can be obtained as well when cross sections of the steel wire are rectangular or elliptic; the effect tends to become higher. In the inventive material, the spring index D/d or D/d' is set to 2 or more, preferably 3 or more in order to restrain damage and embrittlement based on high deformation. In order to make the strength-raising effect high by the introduction of the work strain, the spring index is set to 6 or less, preferably 5 or less.

About Mo and N, which are contained in the stainless steel wire, the atomic percentage ratio of Mo to N (Mo/N) is preferably 0.6 or more and 1.3 or less. The Mo—N cluster contributing to an improvement in the strength is made of one N atom per Mo atom; therefore, if the amount of any one of Mo and N is too large or too small, a high effect cannot be obtained. Thus, the atomic percentage ratio of Mo to N (Mo/N) for obtaining an improvement in the strength effectively is preferably 0.6 or more and 1.3 or less, more preferably 0.9 or more and 1.1 or less.

A preferred embodiment is a spring wherein the spring index D/d or D/d' is 2 or more and 6 or less and the arithmetical average of the Vickers hardnesses of cross sections of the spring is 400 or more and 550 or less after the present steel is subjected to coiling and before the steel is tempered. When the steel undergoes wire drawing work, optional deformation work into a rectangular cross section or elliptic cross section, and coiling are finished, an effect for improving the strength by low-temperature annealing is higher as the average hardness of the cross sections, which can be regarded as an average degree of the work strain introduced to the whole of the material, is higher. Accordingly, after the steel is subjected to coiling and before the spring is annealed, the arithmetical average of the Vickers hardnesses of the cross sections is preferably 400 or more, more preferably 450 or more as a value for improving the strength effectively. To restrain the workability from deteriorating, the arithmetical average is preferably 550 or less, more preferably 500 or less. When this spring material is annealed at a low temperature of 425 to 600° C., the arithmetical average of the Vickers hardnesses of the cross sections turns to 450 or more and 650 or less, preferably 550 or more and 650 or less.

The method of the invention for manufacturing a high-strength stainless steel coil spring which is the above-mentioned spring is characterized by including the steps of: subjecting a stainless steel to wire drawing work, thereby forming a stainless steel wire; subjecting the stainless steel wire to coiling, thereby forming a spring form; and annealing the spring-form stainless steel wire at a temperature of 425 to 600° C. The mechanism of improving the strength is based on the formation of a Mo—N cluster. The Mo—N cluster is formed by the temper treatment.

Figure 2:
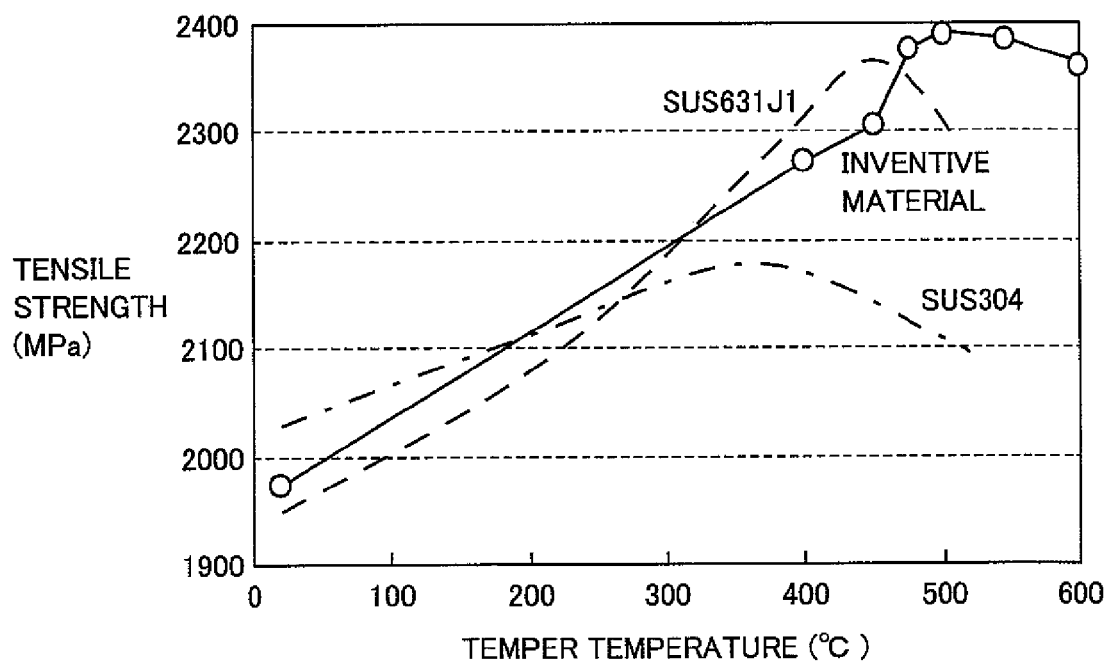
FIG. 2 is a graph showing a relationship between temper temperature and tensile strength in the invention.
Figure 3:
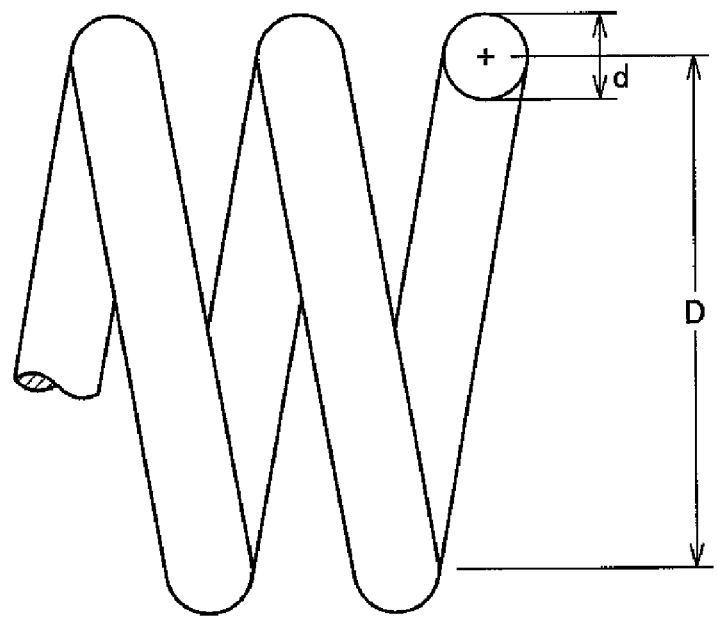
FIG. 3 are views for explaining a conventional spring index.
Figure 3:
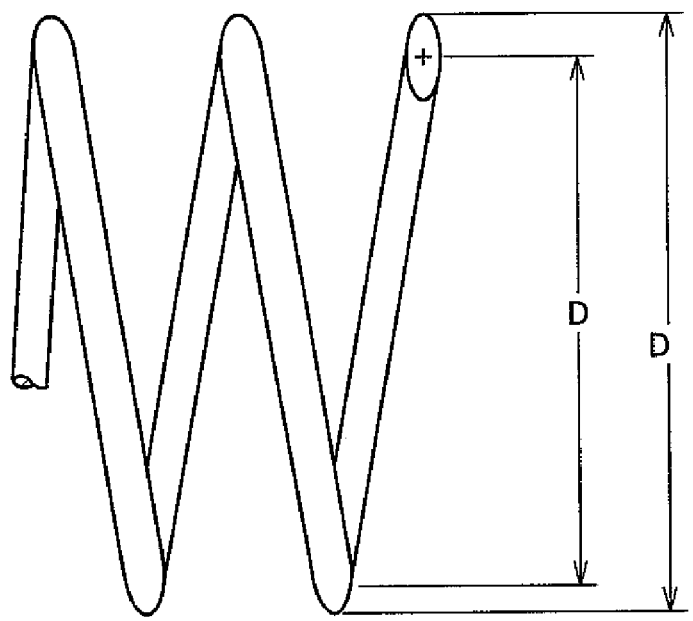

FIG. 2 is a graph showing a relationship between the temper temperature of the inventive material and the tensile strength thereof, which is contrasted with those of SUS 304 and SUS 631J1 (JIS code). The materials each have a wire diameter of 0.55 mm, and the time when each temper temperature is kept is 30 minutes. As illustrated in FIG. 2, about the inventive material represented by open circle, the temperature at which a Mo—N cluster is formed to improve the strength is set to 425° C. or higher, and the temperature at which the strength is not lowered by the annealing is set to 600° C. or lower. When the annealing temperature is in the range of 475 to 550° C., the strength is further promoted so as to give a higher spring load characteristic.

It is preferred to perform shot peening one time or plural times in the production method since the strength is drastically improved. A particularly effective improvement in the strength is attained by performing shot peening before the temper treatment so as to apply work strain based on the shot peening beforehand to a moiety to which the largest stress is to be applied, and then performing the temper. The effect based on the shot peening is not produced onto ordinary stainless steel, and the effect is remarkably produced only onto the inventive material. The step of the shot peening described herein includes, in the category, not only an actual shot peening step but also a strain-relieving annealing step.

It is preferred to conduct multistage treatment of the shot peening since the fatigue characteristic of the spring used under a high stress is improved. Specifically, a high load characteristic and a high fatigue characteristic can be made consistent with each other by performing the following steps after the steel is subjected to wire drawing work: a coiling step, a first shot peening step, a low-temperature annealing step, and a second shot peening step and a subsequent shot peening step. The second shot peening step includes, in the category, strain-relieving annealing. When a third shot peening step is performed after the second shot peening step, the strength-improving effect based on the temper can be more effectively combined with the improvement on the fatigue characteristic since compressive residual stress is added to the spring surface and the spring surface is made flat and smooth.

When the high-strength stainless steel spring of the invention is subjected to nitriding treatment, the fatigue limit can be drastically improved. Even by the nitriding treatment at a high temperature for a long time, the hardness is not lowered; thus, the degree of the contribution of the nitriding treatment to the improvement in the fatigue limit is larger than in conventional springs.

Example 1

The inventive materials were melted, cast, forged, and hot-rolled to produce wire materials (wire diameter: 5.5 mm), and then the wire materials were subjected to solution treatment and wire drawing treatment, thereby producing stainless steel wires each having a wire diameter of 3.0 mm (Inventive materials 1 to 5). In Table 1, the chemical component (% by mass) of each of the stainless steel wires is shown. Next, stainless steel springs having spring factors as shown in Table 2 were produced. The spring index D/d was set to 2.33.

TABLE 1

| Samples | Fe | C | N | Si | Mn | Cr | Ni | Mo | Atomic percentage ratio of Mo/N | Spring index (D/d) |
|---|---|---|---|---|---|---|---|---|---|---|
| Inventive material 1 | Balance | 0.07 | 0.20 | 0.7 | 1.4 | 18.4 | 8.5 | 1.1 | 0.80 | 2.33 |
| Inventive material 2 | Balance | 0.07 | 0.20 | 0.7 | 1.4 | 18.3 | 8.5 | 1.4 | 1.02 | 2.33 |
| Inventive material 3 | Balance | 0.07 | 0.15 | 0.7 | 1.4 | 18.4 | 8.5 | 3.0 | 2.92 | 2.33 |
| Inventive material 4 | Balance | 0.07 | 0.22 | 0.7 | 1.4 | 18.4 | 8.5 | 0.5 | 0.33 | 2.33 |
| Inventive material 5 | Balance | 0.07 | 0.22 | 0.7 | 1.4 | 18.4 | 8.5 | 1.6 | 1.06 | 2.33 |
| Comparative material 1 | Balance | 0.07 | 0.02 | 0.7 | 1.4 | 18.2 | 8.5 | 0.02 | 0.15 | 2.33 |
| Comparative material 2 | Balance | 0.04 | 0.02 | 0.6 | 1.4 | 17.7 | 11.8 | 2.1 | 15.3 | 2.33 |
| Comparative material 3 | Balance | 0.08 | 0.02 | 0.2 | 0.8 | 16.5 | 8.0 | 0.02 | 0.15 | 2.33 |

TABLE 2

| | |
|---|---|
| Wire diameter (d) | 3.0 mm |
| Average coil diameter (D) | 7.0 mm |
| Spring index (D/d) | 2.33 |
| Effective number of turns | 6 |
| Free height | 30 mm |
| End turn portion | Ground |

Thereafter, the springs were subjected to low-temperature annealing. Similarly to conditions for commercially available products, conditions of the annealing of the springs were as follow: a temperature of 500° C. and a time of 20 minutes. The spring constants at this time are shown in Table 3. Table 3 shows the transverse elasticity moduli estimated from the spring constants by use of Wahl's stress correction factor. The spring constants were each the average value (N=3) of values measured from a load change based on each specified displacement quantity (pushing quantities: 5 mm and 10 mm).

TABLE 3

| Samples | Spring constant | Transverse elasticity modulus |
|---|---|---|
| Inventive material 1 | $3.65 \times 10^2$ N/mm | $7.42 \times 10^4$ N/mm$^2$ |
| Inventive material 2 | $3.69 \times 10^2$ N/mm | $7.51 \times 10^4$ N/mm$^2$ |
| Inventive material 3 | $3.61 \times 10^2$ N/mm | $7.33 \times 10^4$ N/mm$^2$ |
| Inventive material 4 | $3.56 \times 10^2$ N/mm | $7.23 \times 10^4$ N/mm$^2$ |
| Inventive material 5 | $3.74 \times 10^2$ N/mm | $7.60 \times 10^4$ N/mm$^2$ |
| Comparative material 1 | $3.34 \times 10^2$ N/mm | $6.78 \times 10^4$ N/mm$^2$ |
| Comparative material 2 | $3.21 \times 10^2$ N/mm | $6.53 \times 10^4$ N/mm$^2$ |
| Comparative material 3 | $3.44 \times 10^2$ N/mm | $7.00 \times 10^4$ N/mm$^2$ |
| SiCr steel | $3.71 \times 10^2$ N/mm | $7.55 \times 10^4$ N/mm$^2$ |

Comparative Example 1

In the same way as in Example 1, stainless steel wires were formed (Comparative materials 1 to 3). In Table 1, the chemical component (% by mass) of each of the stainless steel wires is shown. Next, stainless steel springs having spring factors as shown in Table 2 were produced. Furthermore, a Si—Cr steel oil tempered wire was used to produce a spring having the same spring factors. The spring index D/d was set to 2.33. Thereafter, Comparative material 1 (SUS 304), Comparative material 2 (SUS 316 (JIS code)), and Comparative material 3 (SUS 631J1) were subjected to low-temperature annealing at 400° C. for 20 minutes, at 400° C. for 20 minutes, and at 475° C. for 60 minutes, respectively, and the conditions were substantially equal to conditions set usually for commercially available products. The spring constants and the transverse elasticity moduli are shown in Table 3 in the same manner as in Example 1.

As is evident from Table 3, Inventive materials 1 to 5 each showed a load characteristic substantially equivalent to that of the spring wherein the Si—Cr steel oil tempered wire was used. Furthermore, Inventive materials 1, 2 and 5, wherein the atomic percentage ratio of Mo to N was in the range of 0.6 to 1.3, each showed a higher spring constant and a high transverse elasticity modulus.

Example 2

Inventive materials 1-a, 1-b and 1-c were produced by way of trial in the same way as in Example 1 except that the average coil diameter and the spring index of the steel wire of Inventive material 1 in Example 1 were changed as shown in Table 4. Next, the resultant springs were subjected to low-temperature annealing. Conditions for the annealing were as follows: a temperature of 500° C. and a time of 20 minutes. The spring constants of the resultant samples and the transverse elasticity moduli estimated from the spring constants are shown in Table 5. The spring constants were each the average value (N=3) of values measured from a load change based on each specified displacement quantity (pushing quantities: 5 mm and 10 mm).

TABLE 4

| Samples | Average coil diameter | Spring index |
|---|---|---|
| Inventive material 1-a | 7.0 mm | 2.33 |
| Inventive material 1-b | 13.5 mm | 4.50 |
| Inventive material 1-c | 18.0 mm | 6.00 |
| Comparative material 1-a | 7.0 mm | 2.33 |
| Comparative material 1-b | 13.5 mm | 4.50 |
| Comparative material 1-c | 18.0 mm | 6.00 |
| Comparative material 1-j | 24.0 mm | 8.00 |
| Comparative material 1-k | 24.0 mm | 8.00 |

TABLE 5

| Samples | Spring constant | Transverse elasticity modulus (estimated) |
|---|---|---|
| Inventive material 1-a | $3.65 \times 10^2$ N/mm | $7.42 \times 10^4$ N/mm$^2$ |
| Inventive material 1-b | $5.07 \times 10^1$ N/mm | $7.39 \times 10^4$ N/mm$^2$ |
| Inventive material 1-c | $2.13 \times 10^1$ N/mm | $7.36 \times 10^4$ N/mm$^2$ |
| Comparative material 1-a | $3.34 \times 10^2$ N/mm | $6.78 \times 10^4$ N/mm$^2$ |
| Comparative material 1-b | $4.65 \times 10^1$ N/mm | $6.78 \times 10^4$ N/mm$^2$ |
| Comparative material 1-c | $1.96 \times 10^1$ N/mm | $6.78 \times 10^4$ N/mm$^2$ |
| Comparative material 1-j | $8.79 \times 10^0$ N/mm | $7.20 \times 10^4$ N/mm$^2$ |
| Comparative material 1-k | $8.29 \times 10^0$ N/mm | $6.79 \times 10^4$ N/mm$^2$ |
| SiCr steel | $3.71 \times 10^2$ N/mm | $7.55 \times 10^4$ N/mm$^2$ |

Comparative Example 2

Comparative materials 1-a, 1-b, 1-c and 1-k were produced by way of trial in the same way as in Example 1 except that the average coil diameter and the spring index of the steel wire of Comparative material 1 (SUS 304) in Example 1 were changed as shown in Table 4. Moreover, Comparative material 1-j was produced by way of trail, wherein the average coil material and the spring index of the steel wire of Inventive material 1 in Example 1 were set to 24.0 mm and 8.00, respectively, as shown in Table 4. Furthermore, as a comparative material, a spring was produced by way of trail, wherein the average coil material and the spring index of a Si—Cr oil tempered wire were set to 7.00 mm and 2.33, respectively.

Next, the resultant springs were subjected to low-temperature annealing. Conditions for the annealing of Comparative materials 1-a, 1-b, 1-c and 1-k (SUS 304), and Comparative material 1-j were as follows: a temperature of 400° C. and a time of 20 minutes, and a temperature of 500° C. and a time of 20 minutes, respectively. The spring constants of the resultant samples and the transverse elasticity moduli estimated from the spring constants are shown in Table 5. The spring constants were each the average value (N=3) of values measured from a load change based on each specified displacement quantity (pushing quantities: 5 mm and 10 mm).

As is clear from the results in Table 5, the spring constant was largely changed in accordance with the change in the spring factors; however, it was verified from comparison between the estimated transverse elasticity moduli that Inventive materials 1-a, 1-b, and 1-c, which had the chemical component of the invention, a ratio of Mo/N of 0.6 to 1.3, and a spring index of 2 to 6, each gave a spring load characteristic close to that of the Si—Cr steel. On the other hand, it was verified that Comparative material 1-j, which had a spring index out of the spring index range of 2 to 6 in the invention, had a low transverse elasticity modulus. It was verified that Comparative materials 1-a, 1-b, 1-c and 1-k, wherein SUS 304 was used as a raw material, each exhibited a low transverse elasticity modulus regardless of their spring indexes.

Example 3

The material of Inventive material 1 in Example 1 was used to form a spring made of a steel wire of 2.0 mm diameter and a spring made of a steel wire of 3.0 mm diameter in order to change the hardness after the material was subjected to spring work. The same material was used to form a spring made of a steel wire having a rectangular section, 2.0×1.57 mm, and a spring made of a steel wire having a rectangular section, 3.0×2.36 nm. Their spring factors are shown in Tables 6 and 7.

TABLE 6

| | |
|---|---|
| Wire diameter (d) | Diameter 3.0 mm |
| | Rectangle 3.0 × 2.36 mm |
| Average coil diameter (D) | 7.0 mm |
| Spring index (D/d) | 2.33 |
| Effective number of turns | 6 |
| Free height | 30 mm |
| End turn portion | Ground |

TABLE 7

| | |
|---|---|
| Wire diameter (d) | Diameter 2.0 mm |
| | Rectangle 2.0 × 1.57 mm |
| Average coil diameter (D) | 4.7 mm |
| Spring index (D/d) | 2.35 |
| Effective number of turns | 6 |
| Free height | 20 mm |
| End turn portion | Ground |

The resultant springs were subjected to low-temperature annealing. Conditions for the annealing in each of these cases were as follows: a temperature of 500° C. and a time of 20 minutes. About each of the samples in this case, in Table 8 are shown the average value of Vickers hardnesses of its cross sections after the coiling (and before the temper), and that after the temper; and about each of the springs after the temper, in Table 8 is shown the transverse elasticity modulus estimated from the spring constant thereof. The Vickers hardnesses of the cross sections were measured at 4 directions of an inside, an outside, an upper, and a lower direction of each of the coils in regions extending from the vicinity of the surface to the center. In the vicinity of the surface, the measurement was made at two points wherein the depth was 50 μm and 100 μm, and in the region from a depth of 500 μm to the center, the measurement was made at intervals of 500 μm. At each of the directions, the sampling number (n) was set to 3. The method for measuring the spring constant in the vicinity of the surface and the method for calculating the transverse elasticity modulus were the same as in Example 2.

Comparative Example 3

The material (SUS 304) of Comparative material 1 in Example 1 was used to produce springs by way of trial in the same way as in Example 3, and the springs were subjected to low-temperature annealing at 400° C. for 20 minutes. About each of the samples, in Table 8 are shown the average value of Vickers hardnesses of its cross sections after the coiling (and before the temper), and that after the temper; and about each of the springs after the temper, in Table 8 is shown the transverse elasticity modulus estimated from the spring constant thereof. The measurement and the method for estimation were performed in the same way as in Example 3.

As is evident from Table 8, it was verified that the hardnesses of the materials subjected to the deformation work and the materials subjected to the wire drawing work into a higher degree, out of both of Inventive materials and Comparative materials, increased before the annealing. However, the values were each lower than the hardness of the Si—Cr steel oil tempered wire, and it is demonstrated that the workability was high because the materials were stainless steel wires. In the effect of the temper onto the load characteristic, Inventive materials and Comparative materials were different, and Inventive materials each gave a transverse elasticity modulus equivalent to that of the spring using the Si—Cr steel oil tempered wire while Comparative materials did not gave an equivalent modulus. This demonstrates that the temper gave Inventive materials a high improvement to the strength. It was also understood that as the hardness before the annealing is higher, an increase in the hardness of Inventive materials is larger. About each of Inventive materials 1-d, 1-e and 1-f, the arithmetic average of the Vickers hardnesses of its cross sections was from 400 to 550 before the annealing. As a result of the low-temperature annealing, its characteristics were improved up to a degree equivalent to those of the Si—Cr steel oil tempered wire. From this matter, it was verified that Inventive materials have a high workability equivalent to that of the conventional stainless steel wire (SUS 304) and further has a high load characteristic equivalent to that of the SiCr

TABLE 8

| | | | Cross section hardness | | Transverse |
|---|---|---|---|---|---|
| Samples | Steel species | Steel wire size | Before annealing | After annealing | elasticity modulus |
| Inventive material 1-a | Inventive material 1 | Diameter 3.0 mm | 393 | 442 | $7.42 \times 10^4$ N/mm$^2$ |
| Inventive material 1-d | Inventive material 1 | Rectangle 3.0 × 2.36 mm | 457 | 581 | $7.57 \times 10^4$ N/mm$^2$ |
| Inventive material 1-e | Inventive material 1 | Diameter 2.0 mm | 421 | 503 | $7.53 \times 10^4$ N/mm$^2$ |
| Inventive material 1-f | Inventive material 1 | Rectangle 2.0 × 1.57 mm | 531 | 641 | $7.59 \times 10^4$ N/mm$^2$ |
| Comparative material 1-a | Comparative material 1 | Diameter 3.0 mm | 365 | 407 | $6.78 \times 10^4$ N/mm$^2$ |
| Comparative material 1-d | Comparative material 1 | Rectangle 3.0 × 2.36 mm | 432 | 466 | $6.83 \times 10^4$ N/mm$^2$ |
| Comparative material 1-e | Comparative material 1 | Diameter 2.0 mm | 443 | 478 | $6.91 \times 10^4$ N/mm$^2$ |
| Comparative material 1-f | Comparative material 1 | Rectangle 2.0 × 1.57 mm | 514 | 553 | $6.89 \times 10^4$ N/mm$^2$ |
| SiCr steel | SWOSC-V | Diameter 3.0 mm | 586* | 572 | $7.55 \times 10^4$ N/mm$^2$ |

*About the SiCr steel, the hardness of the steel subjected to quenching and temper followed by coiling is shown. Moreover, the hardness thereof subjected to strain-relieving and annealing (at 420° C. for 20 minutes) is shown.

steel oil tempered wire. As shown in Table 8, about each of Inventive materials, the arithmetic average of the Vickers hardnesses of the cross sections was from 400 to 550 before the annealing, and the Vickers hardnesses of the cross sections were turned into the range of 450 to 650 by the annealing at low-temperature of 425 to 600° C.

Example 4

Springs produced by way of trial using Inventive material 1 in Example 1 in accordance with the spring factors shown in Table 2 were subjected to low-temperature annealing at respective temperatures varied at intervals of 25° C. in the temperature range of 350 to 625° C. for 20 minutes. About the resultant springs, in the same way, the spring constants thereof were measured and then the transverse elasticity moduli ($10^4$ N/mm$^2$) were calculated. The results are shown in Table 9.

Comparative Example 4

Figure 4:
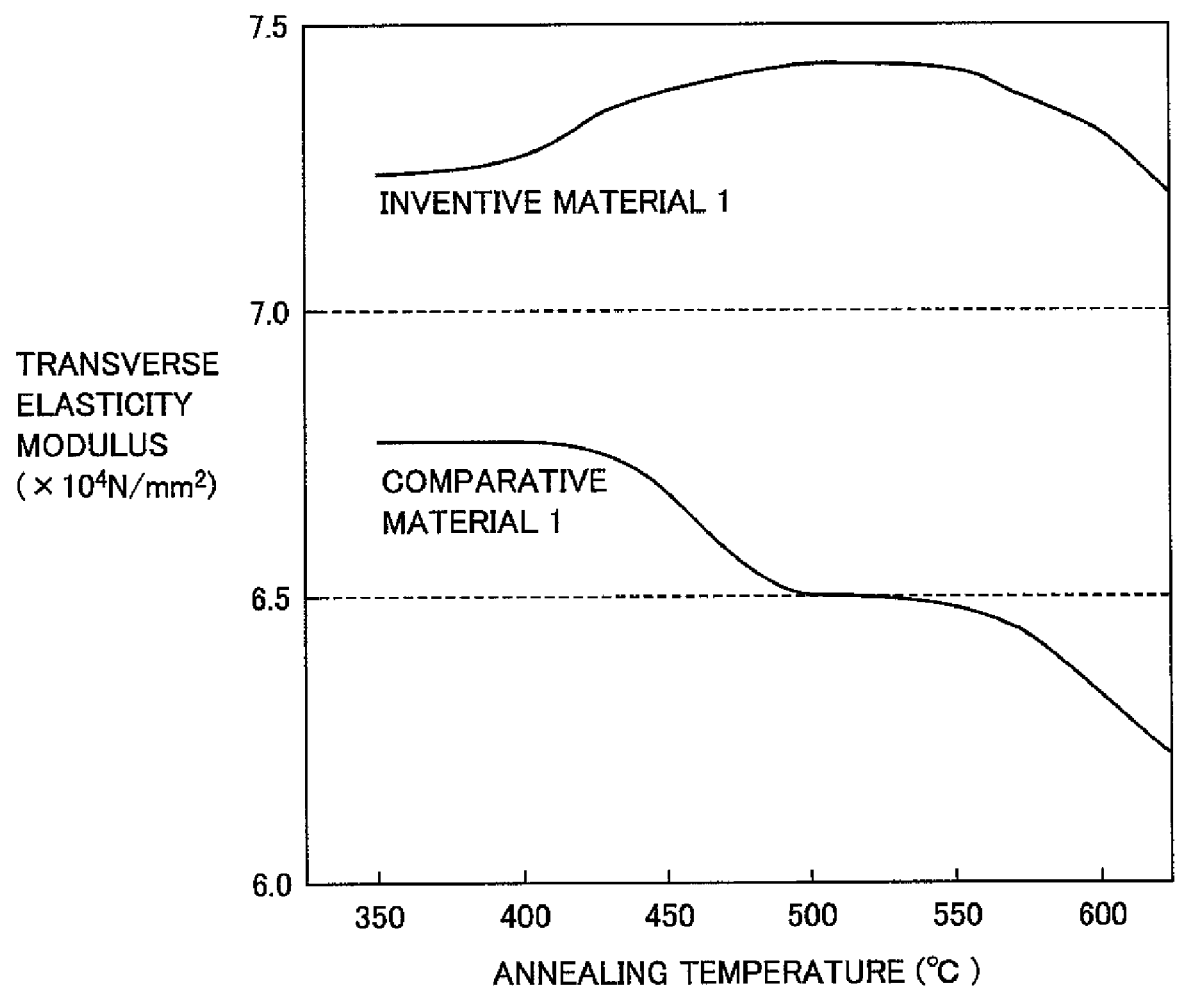
FIG. 4 is a graph showing a relationship between annealing temperature and transverse elastic modulus in the invention.

Springs were produced by way of trials in the same way as in Example 4 except that their chemical component was made into the same as Comparative material 1 (SUS 304) shown in Table 1 had. In the same way, the spring constants thereof were measured, and then the transverse elasticity moduli were calculated. The results are shown in Table 9. FIG. 4 shows a relationship between the annealing temperature of Inventive material and the transverse elasticity modulus thereof, which is contrasted with that of Comparative material 1.

From these results, it was understood that the transverse elasticity modulus was also changed in the same manner as the tensile strength shown in FIG. 2. It was verified that in order to obtain a higher spring load characteristic in Inventive material, it is necessary to set the annealing temperature to 425° C. or higher and 600° C. or lower and it is preferred to set the temperature to 475° C. or higher and 550° C. or lower.

Example 5

Inventive material 1 in Table 1 was used to produce springs by way of trial in accordance with spring factors as shown in Table 2. The springs were annealed at 500° C. for 20 minutes, and subjected to shot peening one or two times under conditions shown in Tables 10 and 11. Table 10 shows the conditions for the first shot peening. Table 11 shows the conditions for the second shot peening. In the case of conducting the shot peening once, low-temperature annealing was conducted after the shot peening. In the case of conducting the shot peening two times in total, Inventive material 1 was successively subjected to wire drawing work, coiling, the first shot peening, low-temperature annealing at 500° C. for 20 minutes, the second shot peening, and thermal treatment at 230° C. for 10 minutes for strain-relief. About the resultant samples, the spring constants were measured and the transverse elasticity moduli were calculated. The results are shown in Table 12.

TABLE 10

| | |
|---|---|
| Arc height (mm) | 0.40 N |
| Coverage (%) | >100 |
| Shot form | Steel balls |
| Shot size (mm) | 0.3 |
| Time (minutes) | 30 |

TABLE 9

| | Annealing temperature | | | | | | | | | | | |
|---|---|---|---|---|---|---|---|---|---|---|---|---|
| | 350° C. | 375° C. | 400° C. | 425° C. | 450° C. | 475° C. | 500° C. | 525° C. | 550° C. | 575° C. | 600° C. | 625° C. |
| Inventive material 1 | 7.23 | 7.24 | 7.26 | 7.33 | 7.37 | 7.40 | 7.42 | 7.42 | 7.41 | 7.35 | 7.31 | 7.20 |
| Comparative material 1 | 6.77 | 6.77 | 6.78 | 6.73 | 6.73 | 6.53 | 6.51 | 6.50 | 6.48 | 6.43 | 6.41 | 6.22 |

($\times 10^4$ N/mm$^2$)

TABLE 11

| | |
|---|---|
| Arc height (mm) | 0.15 N |
| Coverage (%) | >100 |
| Shot form | Steel balls |
| Shot size (mm) | 0.1 |
| Time (minutes) | 30 |

TABLE 12

| Samples | Shot peening | Transverse elasticity modulus |
|---|---|---|
| Inventive material 1-a | Not conducted | $7.42 \times 10^4$ N/mm$^2$ |
| Inventive material 1-g | Conducted (at only one stage) | $7.48 \times 10^4$ N/mm$^2$ |
| Inventive material 1-h | Conducted (at two stages) | $7.48 \times 10^4$ N/mm$^2$ |
| Comparative material 1-a | Not conducted | $6.78 \times 10^4$ N/mm$^2$ |
| Comparative material 1-g | Conducted (at only one stage) | $6.78 \times 10^4$ N/mm$^2$ |
| Comparative material 1-h | Conducted (at two stages) | $6.78 \times 10^4$ N/mm$^2$ |

Comparative Example 5

Springs were produced by way of trial in the same way as in Example 5 except that Comparative material 1 in Table 1 was used. The springs were annealed, and subjected to shot peening. The spring constants and the transverse elasticity moduli are shown in Table 12.

As is evident from the results in Table 12, it was verified that when Inventive material was subjected to the single stage shot peening, the spring load characteristic was made better. On the other hand, about Comparative material, a clear improvement in the characteristic by the single stage shot peening was not recognized. It appears that this results from a matter that work strain was introduced into the spring surface by the first stage shot peening. Furthermore, the second stage shot peening was conducted but the peening did not contribute to an improvement in the spring load characteristic; however, the surface was further flattened and smoothened by the shot peening after the temper.

Moreover, the effect of the second stage shot peening onto the fatigue limit was checked. Table 13 shows the fatigue limits of the samples, which were obtained by means of a spring fatigue tester. The number of repeated operations was set to 10,000,000. The stress condition when each of the samples was not broken or damaged (n=8) is shown. In this test, the average stress was set to 600 MPa.

TABLE 13

| Samples | Shot peening | Fatigue limit (stress amplitude) |
| --- | --- | --- |
| Inventive material 1-a | Not conducted | 250 MPa |
| Inventive material 1-g | Conducted (at only one stage) | 390 MPa |
| Inventive material 1-h | Conducted (at two stages) | 460 MPa |
| Comparative material 1-a | Not conducted | 160 MPa |
| Comparative material 1-g | Conducted (at only one stage) | 270 MPa |
| Comparative material 1-h | Conducted (at two stages) | 310 MPa |

As is evident from the results of the fatigue limits in Table 13, when Inventive material was subjected to the shot peening, Inventive material gave a higher fatigue-limit-improving effect than Comparative material. This appears to be because work strain in the surface of the springs introduced by the shot peening contributed largely to an improvement in the strength. When Inventive material was subjected to the shot peening two times, Inventive material gave an effect of improving the fatigue limit further. This appears to result from a matter that the surface of the stainless steel springs, which is originally affected by the roughness of the wire surface with ease, was made flat and smooth by the two-stage shot peening so that the effect of the strength improved by the first stage shot peening onto the fatigue limit was largely extracted.

Example 6

Inventive material 1 and Comparative material 1 were used to produce springs by way of trial. The springs were each subjected to low-temperature annealing at an appropriate temperature. Their spring factors were according to those in Table 2. Thereafter, the springs were subjected to shot peening under the conditions in Table 9 followed by nitriding treatment. About the springs produced by way of trial in this way, the same fatigue test as in Example 5 was made. The results are shown in Table 14.

TABLE 14

| Samples | Shot peening | Nitriding treatment (at 470° C. for 4 hours) | Fatigue limit (stress amplitude) |
| --- | --- | --- | --- |
| Inventive material 1-g | Conducted (at only one stage) | Not conducted | 390 MPa |
| Inventive material 1-i | Conducted (at only one stage) | Conducted | 490 MPa |
| Comparative material 1-g | Conducted (at only one stage) | Not conducted | 270 MPa |
| Comparative material 1-i | Conducted (at only one stage) | Conducted | 300 MPa |

As is evident from the results in Table 14, the fatigue limit of Inventive material was abruptly improved by conducting the nitriding treatment. On the other hand, in Comparative material, contribution of the nitriding treatment to an improvement in the fatigue limit was small. This results from a matter that by the high-temperature and long-term nitriding treatment, the hardness of Inventive material was not lowered but Comparative material was annealed so that the hardness thereof was lowered.

Example 7

About Inventive material 1 in Table 1, the corrosion resistance thereof was evaluated by a method in accordance with a salt water spraying test method prescribed in JIS Z 2371. Table 15 shows conditions for the salt water spraying test, and a method for the evaluation. Table 16 shows a change in the ratio of an area where rust was generated with the passage of time. About the samples of Inventive material 1, the rust-generated area ratio was obtained with the naked eye on the basis of the external appearance of the wire surface having a length of 100 mm in the vicinity of the center in a state that no liquid remained. The rust-generated area ratio was the average of values of the samples, the number of which was 3.

TABLE 15

| | |
| --- | --- |
| Sample size | Wire diameter: 3.3 mm, and length: 200 mm |
| Sample number | Three |
| Salt solution | Salt concentration: 5% |
| Test temperature | 35° C. |
| Evaluating method | Measurement of the rust-generated area ratio in the surface |

TABLE 16

| | Change with the passage of time (Rust-generated area ratio %) | | | | |
| --- | --- | --- | --- | --- | --- |
| Samples | Day 1 | Day 10 | Day 20 | Day 40 | Day 100 |
| Inventive material 1 | 0 | 0 | 0 | 0.3 | 0.3 |
| Comparative material 1 | 0 | 0 | 0 | 0.5 | 0.5 |
| Si—Cr steel | 87 | 100 | 100 | 100 | 100 |
| Piano wire | 79 | 100 | 100 | 100 | 100 |
| Chromate-treated piano wire | 0 | 0.7 | 2.3 | 8.5 | 24 |

Comparative Example 6

About 5 samples which were a Si—Cr steel oil tempered wire, a piano wire of type B (SUP-B), and a chromate-treated piano wire of type B besides Comparative material 1 (SUS 304) in Table 1 as comparison subjects, the corrosion resistance thereof was evaluated in the same way as in Example 6. Table 16 shows a change in the rust-generated area ratio in the salt water spray test.

As is evident from Table 16, it was verified that Inventive material 1 had a far higher corrosion resistance than the Si—Cr steel or the piano wire of type B, which are conventional high-strength materials for springs, and had a higher corrosion resistance than the piano wire subjected to the corrosion resistant treatment (chromate treatment). This may be based on the elements effective for corrosion resistance, such as N and Mo; however, when it is considered that a large difference was not generated between Inventive material 1 and Comparative material 1, this appears to result from the fact that the metal texture was an austenite single phase. In other words, it can be considered that all metal materials having the ingredient components of the invention exhibit the same corrosion resistance as described above.

The examples disclosed herein should be interpreted to be illustrative and unrestricted in all ways. The scope of the present invention is specified not by the above-mentioned description but by the claims, and is intended to include meanings equivalent to the claims and all variations within the scope specified by the claims.

INDUSTRIAL APPLICABILITY

The high-strength stainless steel spring of the invention is suitable as a spring material for automobile parts and household electric appearance parts, about which strength and corrosion resistance are required to be consistent with each other. The spring is made of an alloy cluster-strengthened by temper, and the alloy gives a better yield when the alloy is worked than precipitation-strengthened alloy and so on. Moreover, corrosion-resisting surface treatment can be omitted; therefore, an increase in costs can be made small, and industrial values are high. In these points, the invention is advantageous. Accordingly, the invention can be effectively used as a die spring or a wire for a die spring.

The invention claimed is:

1. A high-strength stainless steel spring, which is made of a stainless steel wire,
wherein said stainless steel wire has an chemical component containing 0.04 to 0.08% by mass of C, 0.15 to 0.22% by mass N, 0.3 to 2.0% by mass of Si, 0.5 to 3.0% by mass of Mn, 16 to 20% by mass of Cr, 8.0 to 10.5% by mass of Ni, 0.5 to 3.0% by mass of Ma, and the balance of Fe and inevitable impurities, and
said spring has a spring index D/d or D/d' of 2 to 6, wherein
"D" represents the average diameter of the coil
"d" represents the diameter of the steel wire in the case that cross sections of the stainless steel wire are in a complete round form, and
"d'" represents the value obtained by subtracting the average coil diameter from the outer diameter of the coil in the case that the cross sections of the stainless steel wire are in a form other than the complete round form,
wherein an atomic percentage ratio of Mo to N (Mo/N) is from 0.6 to 1.3 in the stainless steel wire, and
wherein an arithmetical average of Vickers hardnesses of the cross sections of the stainless steel wire is from 400 to 550 after the wire is subjected to coiling and before the spring is annealed, and the arithmetical average of the Vickers hardnesses of the cross sections of the stainless steel wire is from 450 to 650 after the spring is annealed.

2. A method of manufacturing a high-strength stainless steel spring which is the spring as recited in claim 1, comprising the steps of: subjecting a stainless steel to wire drawing work, thereby forming a stainless steel wire;
subjecting said stainless steel wire to coiling, thereby forming a spring form; and
annealing said spring-form stainless steel wire at a temperature of 425 to 600° C.

3. The method of manufacturing a high-strength stainless steel spring according to claim 2, further comprising one or more shot peening steps.

4. The method of manufacturing a high-strength stainless steel spring according to claim 3, wherein after the wire drawing work, the coiling step, the shot peening step of a first stage, the annealing step, and the shot peening step of a second stage are performed in this order.

5. The method of manufacturing a high-strength stainless steel spring according to claim 2, wherein said annealing temperature is from 475 to 550° C.

6. The method of manufacturing a high-strength stainless steel spring according to claim 2, wherein nitriding treatment is conducted.

7. The high-strength stainless steel spring according to claim 1, which is used as a die spring or a wire for a die spring.

* * * * *